(No Model.)

H. C. COATS & H. B. REIBER.
FENCE.

No. 341,224. Patented May 4, 1886.

Witnesses.
A. Ruppert.
Q. E. Grant

Inventor:
H. C. Coats,
H. B. Reiber,
Per
Thomas P. Simpson.
Atty.

UNITED STATES PATENT OFFICE.

HENRY CLAY COATS AND HENRY B. REIBER, OF PLEASANT HILL, OHIO.

FENCE.

SPECIFICATION forming part of Letters Patent No. 341,224, dated May 4, 1886.

Application filed March 6, 1886. Serial No. 194,216. (No model.)

*To all whom it may concern:*

Be it known that we, HENRY CLAY COATS and HENRY B. REIBER, citizens of the United States, residing at Pleasant Hill, in the county of Miami and State of Ohio, have invented a certain new and useful Improvement in Portable Fences; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates, generally, to portable fences which may remain a greater or less time on any particular line, and then be easily removed to some other.

The special object of the invention is to support the panels in a simple and convenient manner, so that each panel and its supports may be quickly separated, rapidly put together, and make a strong fence to resist winds, rains, and other casualties.

Figure 1:
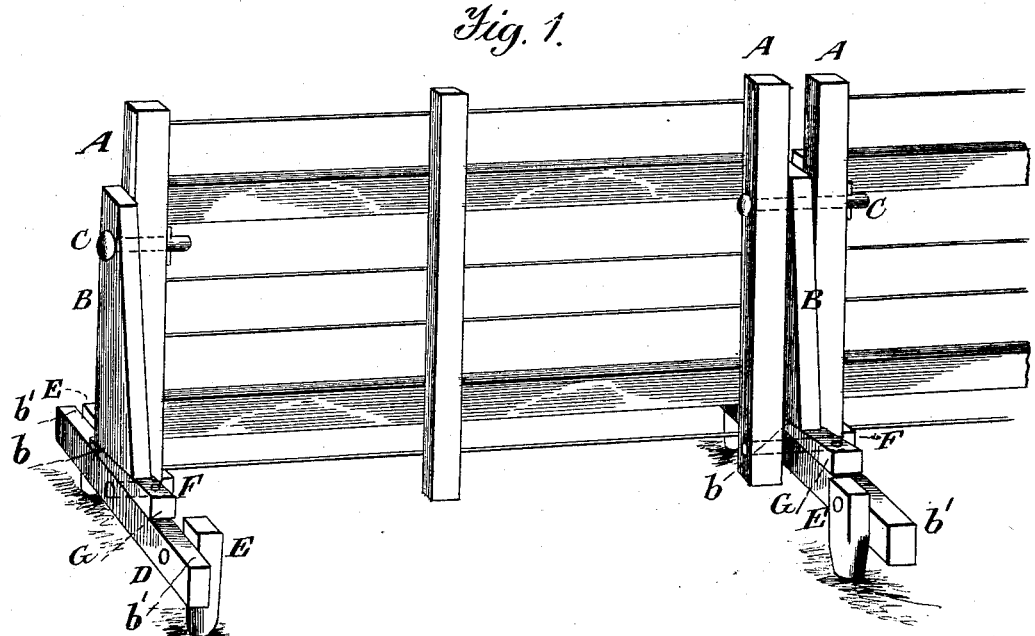
Figure 2:
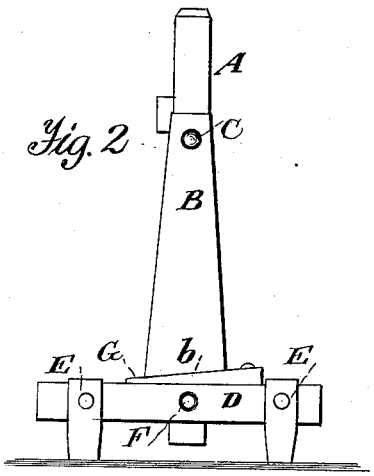
Figure 3:
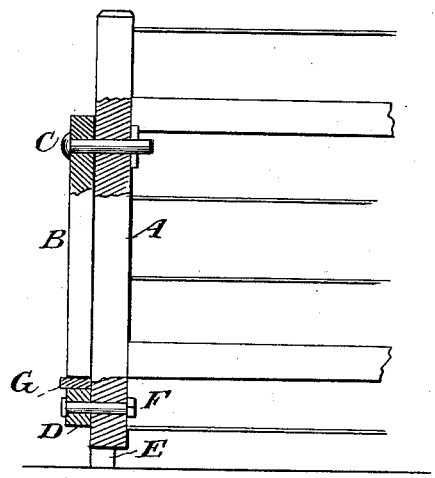

Figure 1 of the drawings is a perspective view showing our invention applied. Fig. 2 is an elevation showing the support apart from the panels, and Fig. 3 is a vertical section through the panel-uprights and swing-bar.

In the drawings, A A represent the two adjacent uprights of two adjoining panels, B the the swinging bar connected at its top to upright A by a pivot, C, and D a cross-bar which is fastened to the ground across the line of fence by the drive-stakes E E, made fast thereto. The bolt F fastens the lower end of each upright A to the cross-bar D; but without some re-enforcing brace the fence would turn on or with the bolt F in a strong wind, or by the rubbing or pressure of animals against it.

In lieu of the use of crossing stakes, as usually employed, we employ the swinging brace-bar B, which is cut with the tapering bottom $b$, in conjunction with a wedge, G, which is driven up under bar B and nailed or bolted to the cross-bar D; or instead of the wedge we may simply have a corresponding incline on the cross-bar and drive the bottom-tapered bar B upon it.

The effect of connecting the panels by our wedge-coupling is, that the power of the wind or animal being applied above the bolt F, the brace-bar B takes the strain and brings it upon the cross bar D at one of the corners $b'$ $b'$, according to the direction from which the pressure comes.

In order to put up our portable fence, the cross-bars D are placed at the proper distance apart, and the stakes E E driven into the ground. The first panel is then attached at one end to a cross-bar, D, by a bolt, F, and to the swinging bar B by a bolt, C, a wedge, G, being driven between the lower end of said swinging bar and the cross-bar. Then another panel is connected with the first one and an intermediate swinging bar by a bolt, C, while the two adjacent panels are connected together and with an intermediate cross-bar, D, by a bolt, F. A wedge, G, is next driven between the swinging bar and the cross-bar, and in this way two men will rapidly put up the fence. It is obvious that the fence can be easily and quickly taken apart.

Having thus described all that is necessary to a full understanding of our invention, what we claim as new, and desire to protect by Letters Patent, is—

The combination, in a portable fence, of the two adjacent panel-uprights A A, the brace-bar B, having a tapered bottom, $b$, a wedge or incline, G, the bolts C F, and the cross-bar D, fastened to the ground, whereby the panels of the fence may be braced, as shown and described.

In testimony whereof we affix our signatures in presence of two witnesses.

HENRY CLAY COATS.
HENRY B. REIBER.

Witnesses:
JACOB REIBER,
JOHN H. SPONSLER.